(12) United States Patent
Richman

(10) Patent No.: US 11,076,711 B2
(45) Date of Patent: Aug. 3, 2021

(54) SELF-LOCKING DEVICE FOR HANGING OBJECTS

(71) Applicant: Ryan Richman, Delmar, NY (US)

(72) Inventor: Ryan Richman, Delmar, NY (US)

( * ) Notice: Subject to any disclaimer, the term of this patent is extended or adjusted under 35 U.S.C. 154(b) by 793 days.

(21) Appl. No.: 15/936,405

(22) Filed: Mar. 26, 2018

(65) Prior Publication Data
US 2019/0290029 A1 Sep. 26, 2019

(51) Int. Cl.
*A47G 1/21* (2006.01)
*F16B 45/04* (2006.01)
*F16B 2/12* (2006.01)
*F16B 5/12* (2006.01)
*F16B 45/02* (2006.01)
*A47G 1/16* (2006.01)
*F16B 2/10* (2006.01)

(52) U.S. Cl.
CPC ............. *A47G 1/21* (2013.01); *A47G 1/1633* (2013.01); *F16B 2/10* (2013.01); *F16B 2/12* (2013.01); *F16B 5/123* (2013.01); *F16B 45/02* (2013.01); *F16B 45/04* (2013.01)

(58) Field of Classification Search
CPC .... F16B 2/10; F16B 2/12; F16B 5/123; F16B 45/02; F16B 45/04; A47G 1/21; A47G 1/1633
See application file for complete search history.

(56) References Cited

U.S. PATENT DOCUMENTS

| 3,020,013 | A | * | 2/1962 | Ochin | ...................... | A47G 1/20 248/493 |
| 4,420,138 | A | | 12/1983 | Sobel | | |
| 4,712,761 | A | | 12/1987 | Wassell | | |
| 4,787,590 | A | * | 11/1988 | Melvin | ..................... | A47G 1/21 16/227 |
| 6,279,257 | B1 | | 8/2001 | Lemire | | |
| 2007/0235978 | A1 | * | 10/2007 | Mihelic | ................ | B62K 15/006 280/287 |
| 2012/0318945 | A1 | | 12/2012 | Vallimont | | |
| 2017/0347812 | A1 | | 12/2017 | Will et al. | | |

FOREIGN PATENT DOCUMENTS

| CN | 107687473 | 2/2018 |
| DE | 102010028363 | 11/2011 |
| WO | 2007113179 | 10/2007 |

OTHER PUBLICATIONS

International Search Report and Written Opinion issued in PCT/US2019/024158, dated Jun. 21, 2019.

* cited by examiner

*Primary Examiner* — Anita M King
(74) *Attorney, Agent, or Firm* — Heslin Rothenberg Farley & Mesiti P.C.; Kristian E. Ziegler, Esq.

(57) ABSTRACT

A self-locking device having a locking mechanism is configured to lock an object. A mounting bracket contrivance includes a guide track implement for engaging the locking mechanism. A notch implement is configured to allow said locking mechanism to rotate out into an open position and a back stop is configured to hold the locking mechanism within the notch implement in an open position. A is configured to inhibit the locking portion from escaping the guide track implement. A base plate tool is used to mount the mounting bracket contrivance to a mounting surface and elevated the mounting bracket contrivance off the mounting surface.

20 Claims, 10 Drawing Sheets

SELF-LOCKING DEVICE FOR HANGING OBJECTS

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to household hardware. More particularly, certain embodiments of the invention relate to a self-locking device for hanging objects.

The following background information may present examples of specific aspects of the related technology (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that when hanging a large picture on a wall, it may be difficult to assure that the frame is seated correctly on the hanging hardware. In some applications, a wire stretched across the back of the frame may be used to attach to the frame to hardware attached to the wall, for example without limitation, nails, screws, or hooks. In other applications various different types of hardware may be attached to the back of the frame to engage with the wall hardware such as, but not limited to, hooks, D-rings, sawtooth hangers, etc. Due to the difficulty of seeing behind the frame when holding the frame up to the wall to engage the hanging hardware, one may expect that it may be challenging to confirm that the wire, hook, or other frame hardware is seated properly on the wall hardware. In addition, there is often a risk that the wire or frame hardware may become dislodged from the wall hardware as the frame is released and pulls down on or away from the wall hardware.

The following is an example of a specific aspect in the related technology that, while expected to be helpful to further educate the reader as to additional aspects of the related technology, is not to be construed as limiting the present invention, or any embodiments thereof, to anything stated or implied therein or inferred thereupon. By way of educational background, an aspect of the related technology generally useful to be aware of is that there are some currently available devices that may act as locking picture frame hangers. Some such devices may be implemented as spring loaded carabineers. Another such device may be implemented as a clip that engages onto the back of a picture frame. It believed that this device typically locks the clip in place laterally on the frame itself and typically does not lock the frame onto the wall. Rather this device normally functions to lock the hanging clip onto the picture frame. Yet another such device involves a dual step system where interlocking parts of a wall bracket and a frame bracket correspond to fix a frame onto a wall so that the frame typically cannot move laterally. Again, this device typically does not lock the frame onto the wall. Yet another such device may be geared to lock a frame onto a wall to help prevent theft and requires specialized hardware both on the wall and on the frame itself as well as a special tool to secure the frame in place on the device.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a top perspective view. FIG. 1B is a bottom perspective view, and FIG. 1C is a bottom perspective view of the mounting bracket in engagement with a base plate;

FIG. 2A is a top perspective view. FIG. 2B is a diagrammatic side view. FIG. 2C is rear perspective view;

FIG. 4A is a front perspective view. FIG. 4B is a side perspective view, and FIG. 4C is a bottom perspective view;

FIG. 5A is a top perspective view, and FIG. 5B is a diagrammatic side view;

FIG. 7 is a rear perspective view.

Figure 1A:
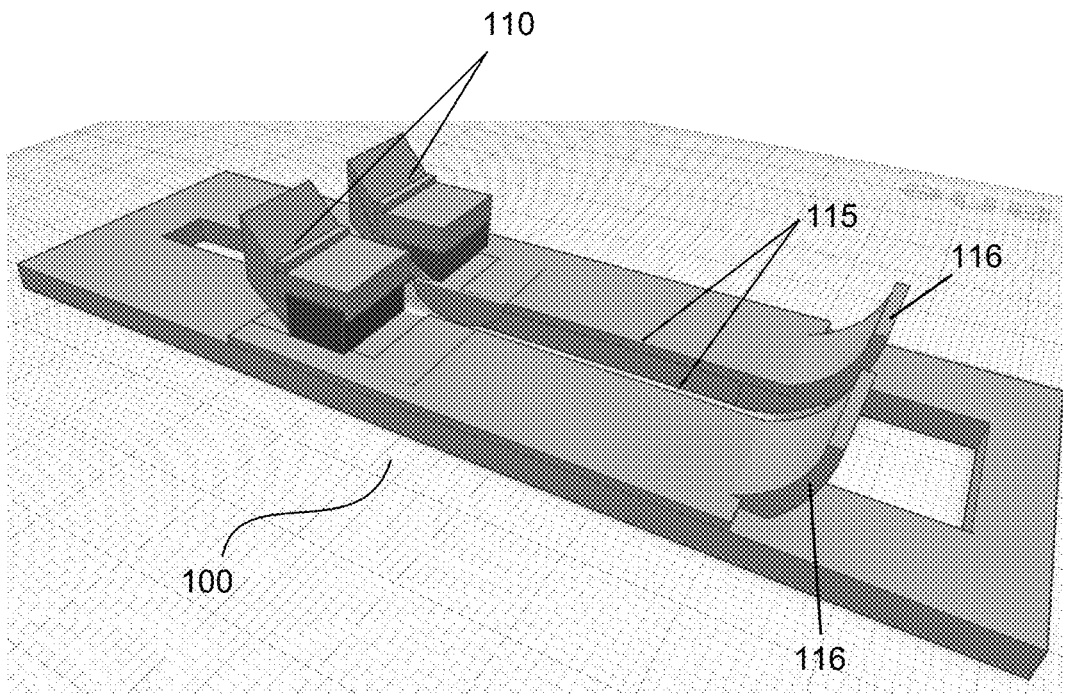
FIGS. 1A, 1B, and 1C illustrate an exemplary mounting bracket for a self-locking device for hanging objects, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit "about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to avoid a strict numerical boundary to the specified parameter," see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction with, some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

An embodiment of the present invention may provide a self-locking device for hanging objects. The device may be implemented as a hanging hook that features a self-locking mechanism that requires no special tools to lock onto a surface, such as, but not limited to, a wall, and no special tools to remove. The device may comprise a locking mechanism, which slides along tracks on a mounting bracket. This locking mechanism may be able to lock an object onto the mounting bracket. The tracks may be designed so that the locking mechanism can typically only be removed while the entire device is removed from the surface to which the object is being attached.

Figure 1B:
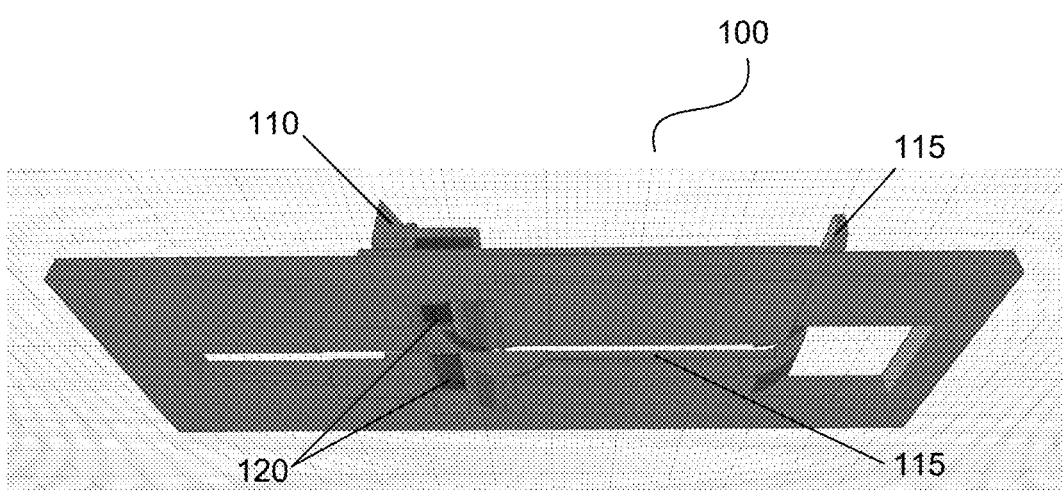
Figure 1C:
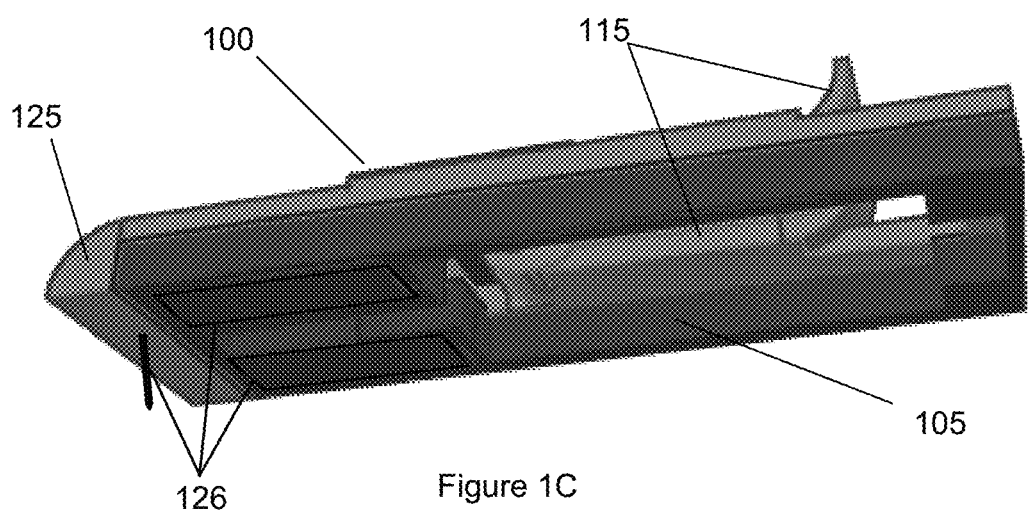

FIGS. 1A, 1B, and 1C illustrate an exemplary mounting bracket 100 for a self-locking device for hanging objects, in accordance with an embodiment of the present invention. FIG. 1A is a top perspective view. FIG. 1B is a bottom perspective view, and FIG. 1C is a bottom perspective view of mounting bracket 100 in engagement with a base plate 105. In the present embodiment, mounting bracket 100 may comprise one or more hooks 110 onto which a frame wire or frame hardware may be hung. It is contemplated that a multiplicity of suitable types of hooks or other connectors may be located on mounting bracket 100 in some embodiments to accommodate different types of frames and hardware such as, metal circles, D-rings, sawtooth hangers, other hooks, etc. In the present embodiment, mounting bracket 100 may also comprise a guide track implement with one or more guide tracks 115 having a curved lip end portion 116 which may be curved at the bottom ends and may end in notches 120 at the top. Tracks 115 may substantially engage with a locking mechanism as illustrated by way of example in subsequent drawings. Referring to FIG. 1C, base plate 105 may be placed between mounting bracket 100 and the surface on which mounting bracket is to be situated so that mounting bracket 100 and tracks 115 may be elevated off of the surface. In the present embodiment mounting bracket 100 and base plate 105 are shown as two separate pieces. In some embodiments the base plate may be built into the mounting bracket in a one piece assembly. In the present embodiment, mounting bracket 100 and base plate 105 may be made of various different materials such as, but not limited to, plastic, metal, or wood and may be constructed using a variety of different means including, without limitation, injection molding, 3D printing, machining, etc. A curved cap 125 may be placed at the top of mounting bracket 100 to substantially inhibit wires or other hanging means from catching on the top of mounting bracket 100 or base plate 105.

Figure 2A:
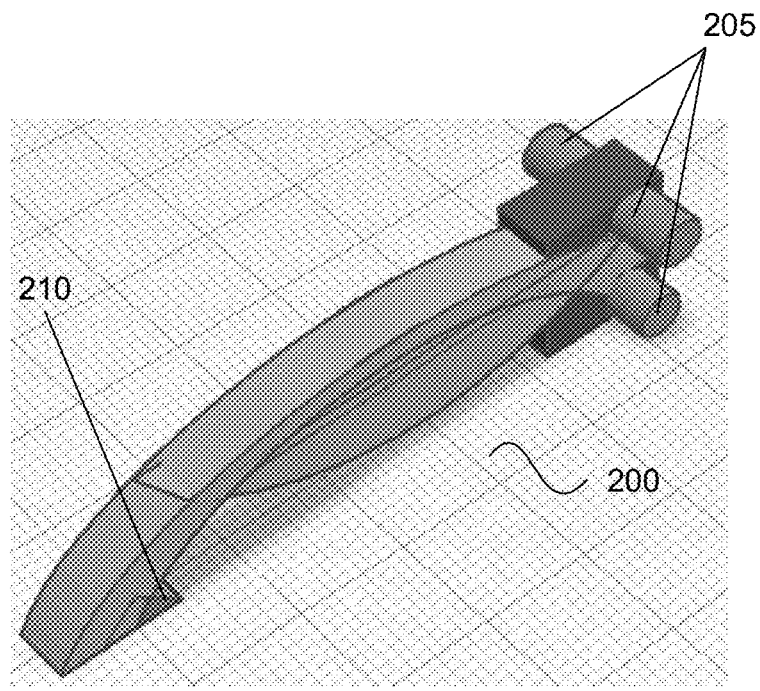
FIGS. 2A, 2B, and 2C illustrate an exemplary locking mechanism, in accordance with an embodiment of the present invention.
Figure 2B:
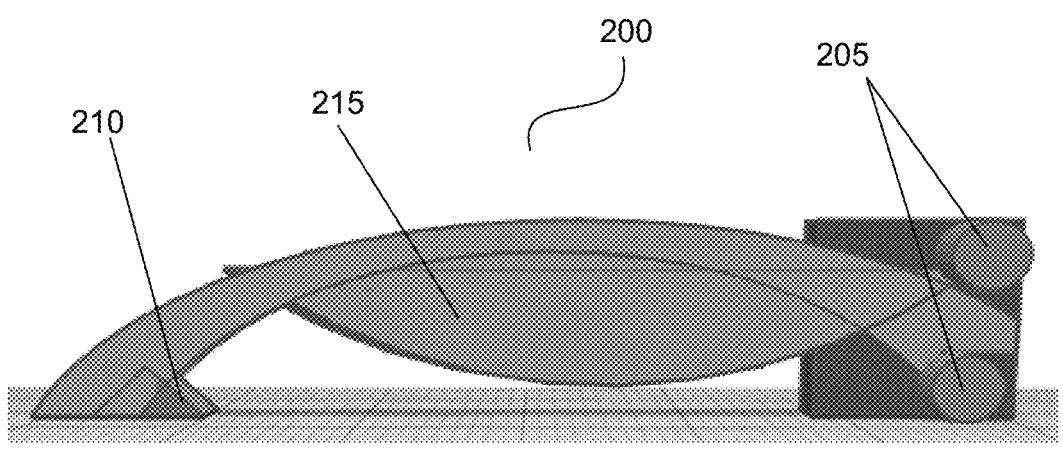
Figure 2C:
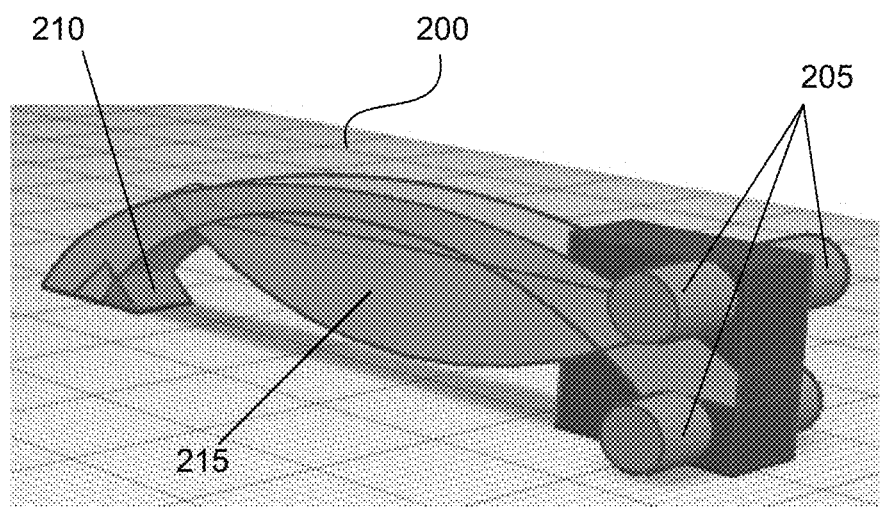

FIGS. 2A, 2B, and 2C illustrate an exemplary locking mechanism 200, in accordance with an embodiment of the present invention. FIG. 2A is a top perspective view FIG. 2B is a diagrammatic side view, and FIG. 2C is rear perspective view. In the present embodiment, locking mechanism 200 may comprise a post implement comprising two or more posts 205 on each side of the rear portion, and a hooked tip 210 at the front portion. Posts 205 may enable locking mechanism 200 to engage with the tracks of a mounting bracket and to slide along the tracks. Hooked tip 210 may help locking mechanism 200 engage with hanging hardware on the object being hung. A curved portion 215 near the center of locking mechanism 200 may help to ensure that the hanging hardware on the object being hung is seated correctly onto hooks on the mounting bracket and substantially inhibits the hanging hardware from falling off of the hooks. Locking mechanism 200 may be made of a multiplicity of suitable materials such as, but not limited to, plastic, metal, or wood and may be constructed using various different means including, without limitation, injection molding, 3D printing, machining, etc.

Figure 3:
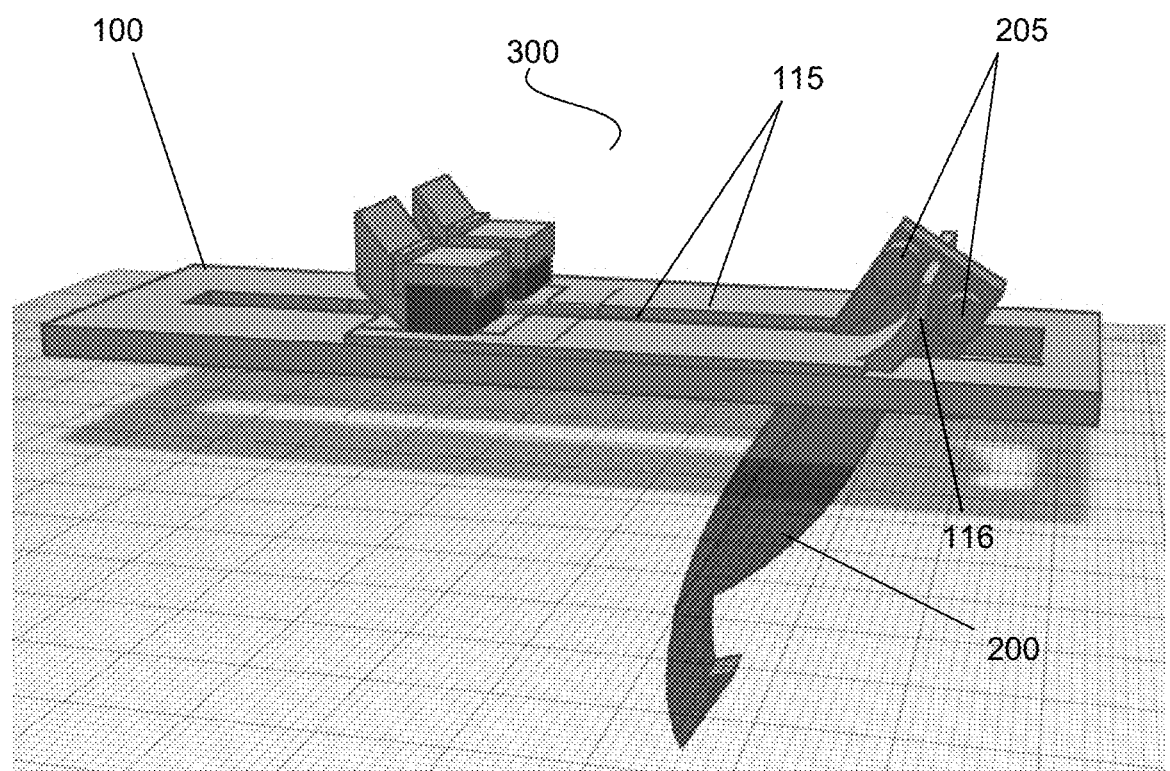
FIG. 3 is a side perspective view of an exemplary self-locking device for hanging objects, in accordance with an embodiment of the present invention.

FIG. 3 is a side perspective view of an exemplary self-locking device 300 for hanging objects, in accordance with an embodiment of the present invention. In the present embodiment, self-locking device 300 comprises a mounting bracket 100 and a locking mechanism 200. Locking mechanism 200 is shown being placed onto tracks 115 of mounting bracket 100 with posts 205 on each side of locking mechanism 200 engaging with curved lip end portions 116 of tracks 115. Typically locking mechanism 200 may be installed on or removed from tracks 115 while mounting bracket 100 is removed from the surface on which it is to be situated since the curved lip end portions of the bottom portion of tracks 115 in concert with posts 205 may cause locking mechanism 200 to be angled steeply in the direction of the mounting surface when locking mechanism 200 is initially slid onto tracks 115.

Figure 4A:
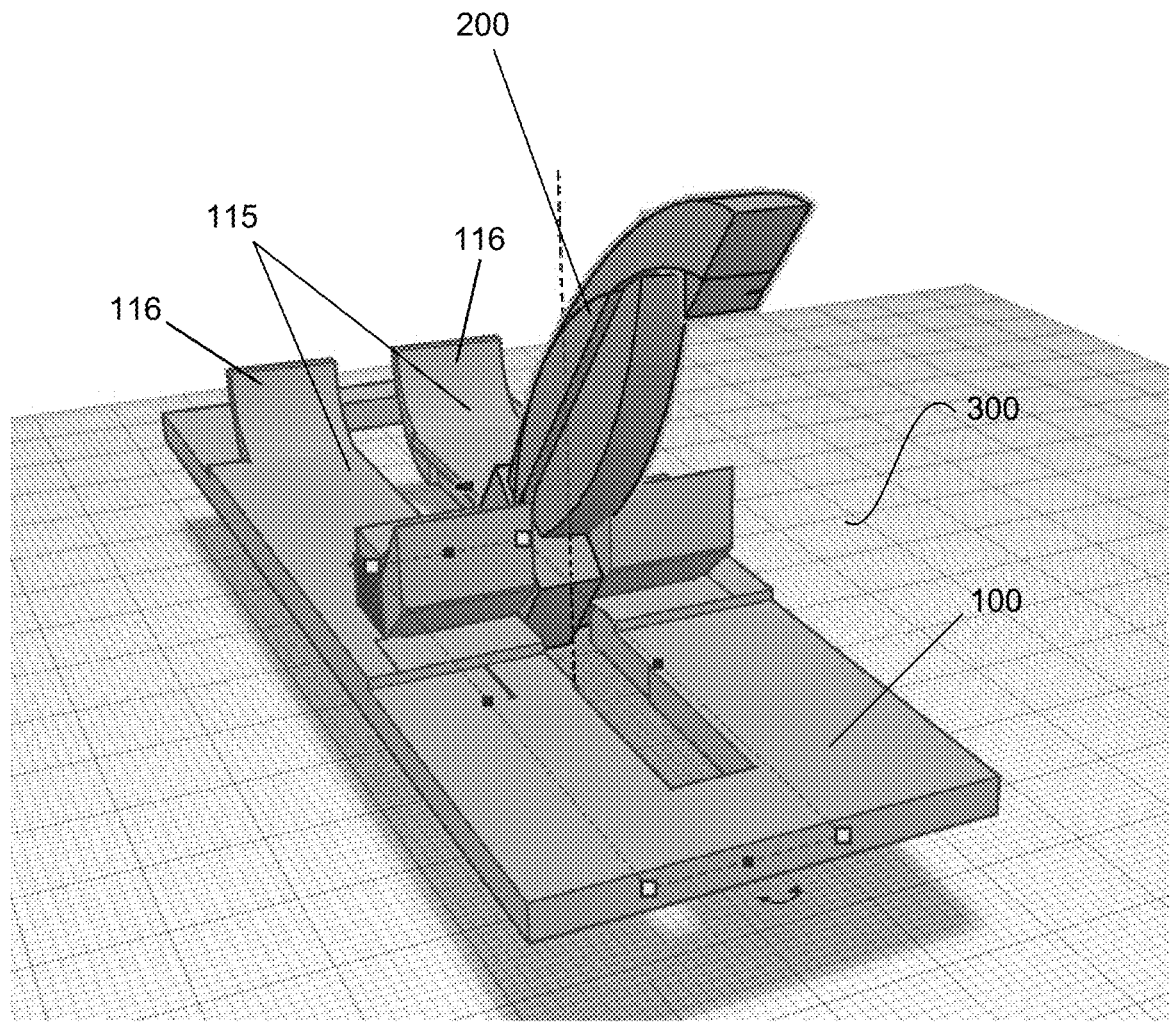
FIGS. 4A, 4B, and 4C illustrate an exemplary self-locking device for hanging objects with a locking mechanism in a fully installed, open position, in accordance with an embodiment of the present invention.
Figure 4B:
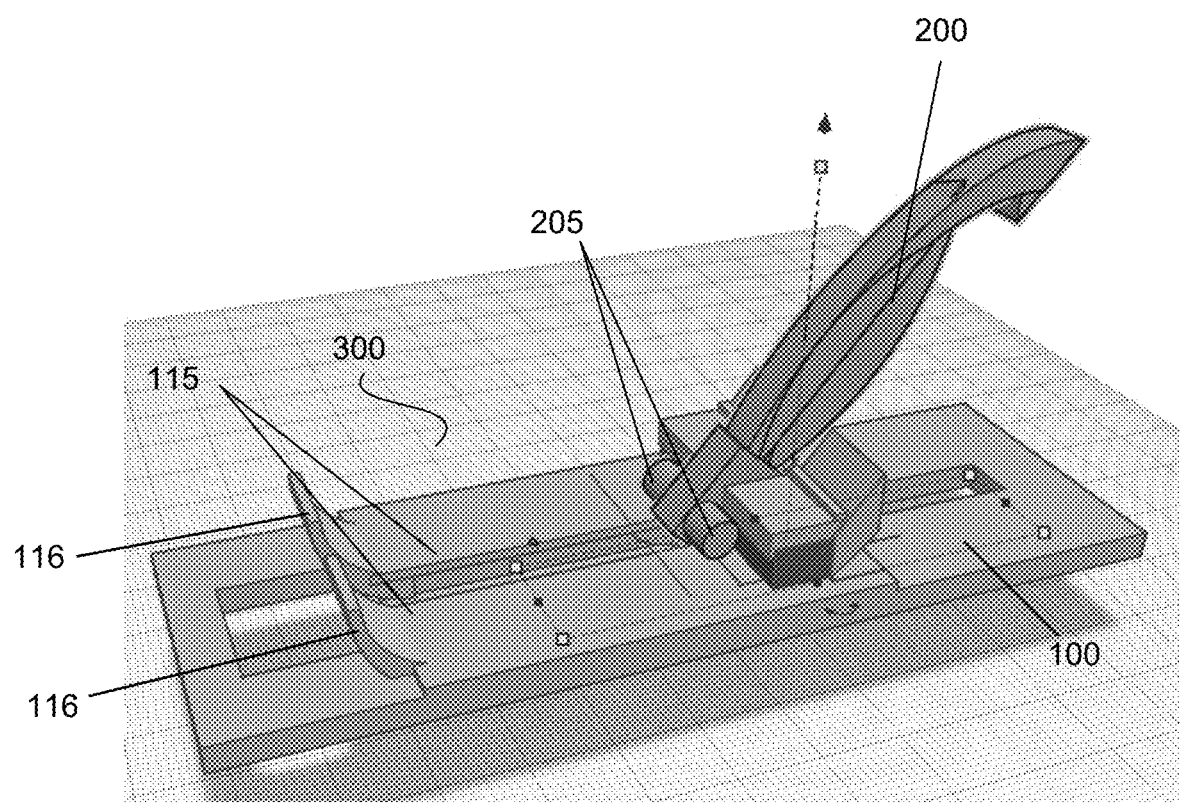
Figure 4C:
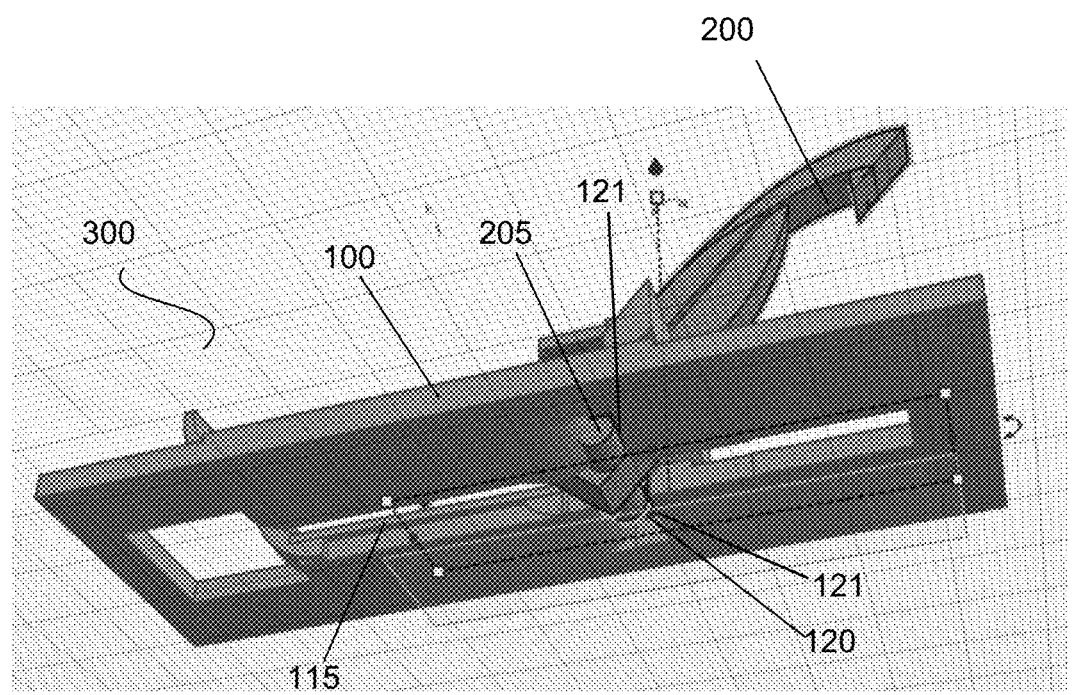

FIGS. 4A, 4B, and 4C illustrate an exemplary self-locking device 300 for hanging objects with a locking mechanism 200 in a fully installed, open position, in accordance with an embodiment of the present invention. FIG. 4A is a front perspective view. FIG. 4B is a side perspective view, and FIG. 4C is a bottom perspective view. After locking mechanism 200 is initially placed on tracks 115, as illustrated by way of example in FIG. 3, posts 205 of locking mechanism 200 may be slid along tracks 115 up from the curved bottom portion 116 of tracks 115 and into notches 120. This typically allows locking mechanism 200 to rotate out into the open position. Each notch 120 may comprise a lip and/or a back stop 121 to aid in holding posts 205 in notches 120 when locking mechanism is in the open position, as shown in FIG. 4C. It is contemplated that in some embodiments the notches and any post retention means such as, but not limited to, lips or back stops could be altered for example, without limitation, in depth or curve angle based on the type and configuration of the locking mechanism. Some embodiments may be implemented without such retention means for the notches. In the present embodiment, once locking mechanism is in this open position self-locking device 300 may be mounted onto a wall or another surface. A base plate similar to base plate 105 shown by way of example in FIG.

1C may be mounted between mounting plate 100 and the surface to elevate tracks 115 off of the surface to typically provide space for the rear portion of locking mechanism 200 to slide along tracks 115 between mounting bracket 100 and the mounting surface. In other embodiments the mounting bracket may be implemented in a way in which the tracks may be elevated without the use of a base plate. Those skilled in the art will readily recognize, in light of and in accordance with the teachings of the present invention, that a multiplicity of suitable means 126 may be used to mount self-locking device 300 to a surface including, without limitation, adhesive strips, nails, screws, glue, hook and loop material, magnets for metal surfaces, brackets, suction cups, mortice and tennon joint, other carpentry joints, etc.

Figure 5A:
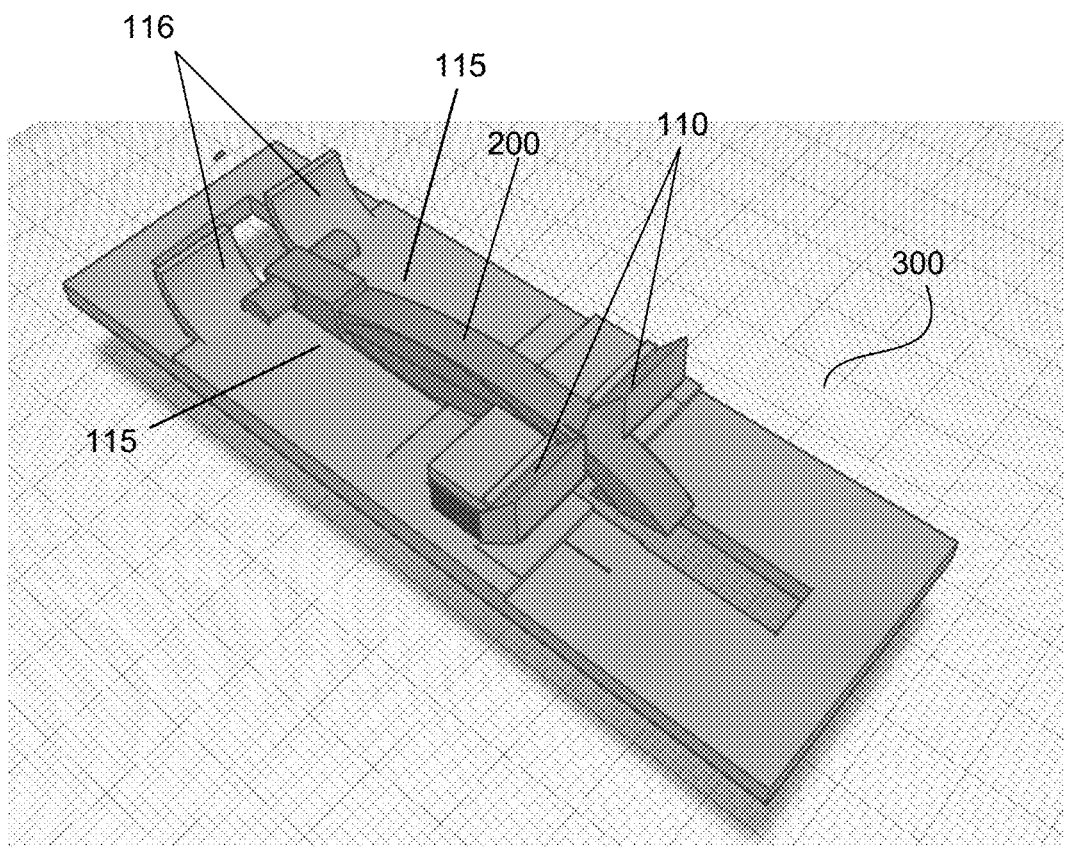
FIGS. 5A and 5B illustrate an exemplary self-locking device for hanging objects with a locking mechanism in a locked position, in accordance with an embodiment of the present invention.
Figure 5B:
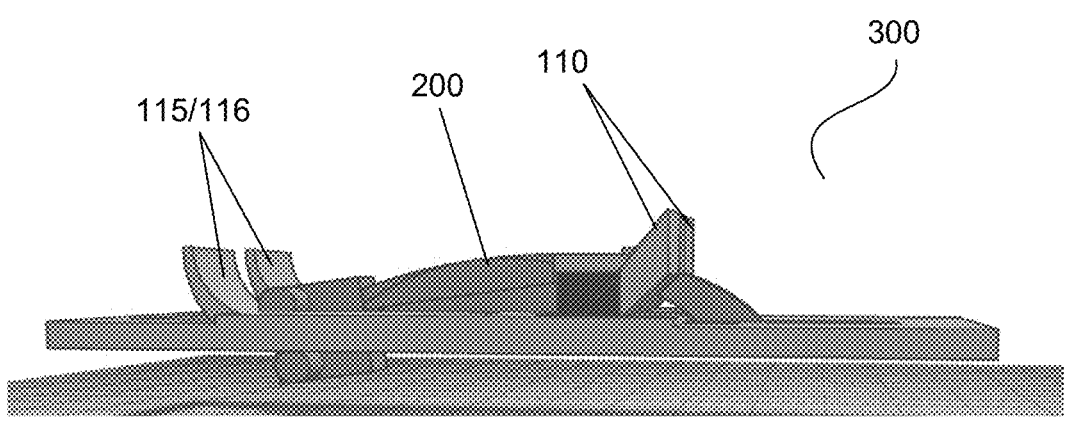

FIGS. 5A and 5B illustrate an exemplary self-locking device 300 for hanging objects with a locking mechanism 200 in a locked position, in accordance with an embodiment of the present invention. FIG. 5A is a top perspective view, and FIG. 5B is a diagrammatic side view. In the present embodiment, when an object is loaded onto hooks 110 on a mounting bracket 100 with locking mechanism 200 is in an open position, as illustrated by way of example in FIGS. 4A, 4B, and 4C, locking mechanism 200 may be engaged by the hanging hardware on the object. Once engaged, locking mechanism 200 may serve as a guide to direct the hanging hardware onto hooks 110. This may be achieved since the engagement of locking mechanism typically causes locking mechanism 200 to rotate toward mounting bracket 100 and out of notches 120 and to then slide down tracks 115 into the locked position shown. A curved portion 215 and a hooked tip 210 on locking mechanism 200, as shown by way of example in FIGS. 2A, 2B, and 2C may help with the guidance of the hardware onto hooks 110. The curved lip end portion 116 at the lower end of tracks 115 substantially inhibit locking mechanism 200 from escaping tracks 115 as locking mechanism would typically be pushed into a steep angle toward the hanging surface by these curves and would normally be stopped by the hanging surface before escaping tracks 115. It is contemplated that some embodiments may comprise angled rather than the curved portions 116 of the tracks 115. In addition the degree of the angle or curvature of the track may be altered in some embodiments. A range of angles may be possible based on various factors such as, but not limited to, the size of the track and the length of the locking mechanism. This range may include, but is not limited to, angles between 30 to 70 degrees.

In typical use of the present embodiment, self-locking device 300 may be used to hang various different objects such as, but not limited to, framed pictures, mirrors, unframed canvases, signs, shelves, clocks, plants, sculptures, lighting, and tools to a multiplicity of suitable surfaces including, but not limited to walls, ceilings, doors, fences, furniture pieces, or appliances. The following example describes how self-locking device 300 may be used to hang a framed picture with a hanging wire on a wall. First, locking device 200 may be placed on mounting bracket 100 by engaging posts 205 with tracks 115 as shown by way of example in FIG. 3. Then, locking mechanism 200 is slid upward along the track until posts 205 enter notches 120. Notches 120 typically enable locking mechanism 200 to rotate outward into the open position to accept a mounting wire as shown by way of example in FIGS. 4A, 4B, and 4C. Self-locking device 300 may then be mounted to the wall with the curved portions of tracks 115 at the bottom of mounting bracket 100. With locking mechanism 200 in the open position, the picture may then be loaded onto locking mechanism 200. Once engaged by the mounting wire, locking mechanism 200 may guide the wire into a groove created by hooks 110 on mounting bracket 100. Locking mechanism 200 may then be allowed to slide down tracks 115 so that hooked tip 210 engages with the wire to hold the wire securely on hooks 110 locking the picture onto mounting bracket 100. Tracks 115 and posts 205 may engage to typically enable locking mechanism 200 to slide along tracks 115. Yet the curves at the bottom of tracks 115 may substantially inhibit the installation or removal of locking mechanism 200 when mounting bracket 100 is mounted to the wall. Moreover, with locking mechanism 200 engaged, the wire typically cannot be pulled away from the wall due to the engagement of posts 205 on tracks 115, which substantially inhibits lateral movement. Furthermore, hooks 110 substantially inhibit downward movement of the wire. If it is desired to remove the picture from the wall, the picture may be removed by lifting the picture frame up. This act typically pulls locking mechanism 200 up along tracks 115 and into notches 120 to the open position, which may enable the picture to be removed from mounting bracket 200.

It is believed that the present embodiment may enable objects to be secured to a wall in a locked manner, typically without the need for special equipment or tools. With previous approaches special hardware or tools and/or modifications to the frame or the use of a special frame may be required. The present embodiment typically does not require the object being hung to be altered, and typically does not requires a special frame or hanging device. Some previous approaches may involve moving and tightening connectors behind the frame itself. The present embodiment may allow for easy mounting and removal of the picture objects.

Those skilled in the art will readily recognize, in light of and in accordance with the teachings of the present invention, that some embodiments may comprise alternatively designed hanging hooks and/or locking mechanisms on the mounting bracket to allow for different types of hanging objects. For example, without limitation, some embodiments may be implemented with thinner locking mechanisms and differently shaped hanging hooks on the mounting bracket to hold frames without wires. Other embodiments may be configured to hang keys, to mount televisions or other heavy objects if strengthened, to hang curtains, mount a kayak, hold bags, potted plants, wires, etc.

Figure 6:
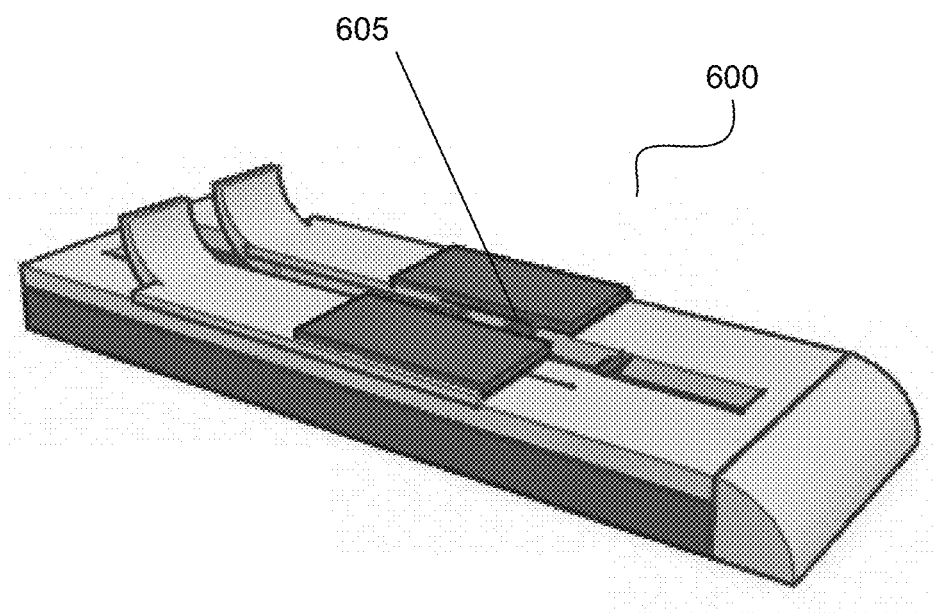
FIG. 6 is a side perspective view of an exemplary mounting bracket that may be used with a locking mechanism to hang keys, in accordance with an embodiment of the present invention

FIG. 6 is a side perspective view of an exemplary mounting bracket 600 that may be used with a locking mechanism to hang keys, in accordance with an embodiment of the present invention. In the present embodiment, mounting bracket 600 comprises a cross beam implement 605 with which a hanging bar, similar to locking mechanism 700 illustrated by way of example in FIG. 7, may be engaged in a locked position. The keys may be hung on the hanging bar directly, which may lock and hang the keys.

Figure 7:
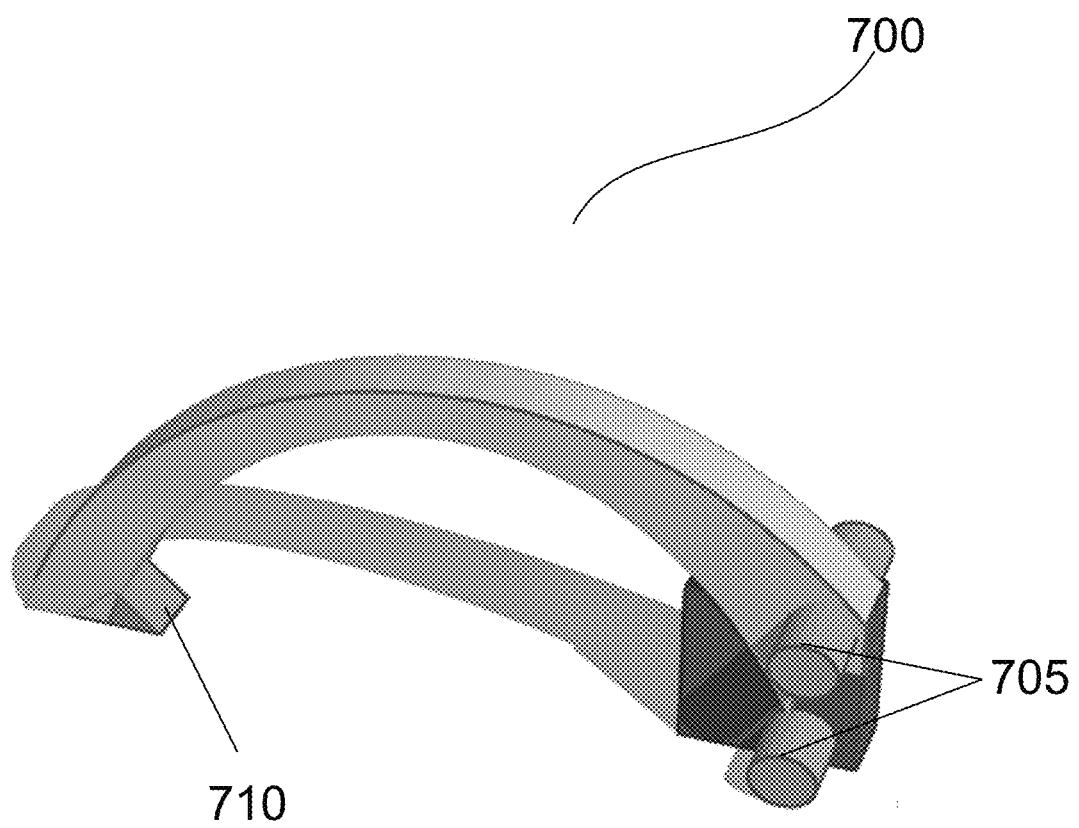
FIG. 7 illustrates an alternative exemplary locking mechanism, in accordance with an embodiment of the present invention.

FIG. 7 is a rear perspective view of an alternative exemplary locking mechanism 700, in accordance with an embodiment of the present invention. In this embodiment, the locking mechanism 700 is a hanging bar which may be used for hanging keys and other small objects such as, but not limited to, jewelry, handbags, etc. The locking mechanism 700 may be used in combination with mounting bracket 600. In the present embodiment, locking mechanism 700 may comprise two or more posts 705 on each side of the rear portion and a hooked tip 710 at the front portion. Hooked tip 710 may help locking mechanism 700 engage with objects being hung. Locking mechanism 700 may be made of a multiplicity of suitable materials such as, but not limited to, plastic, metal, or wood and may be constructed using various different means including, without limitation, injection molding, 3D printing, machining, etc.

In some applications self-locking devices may be mounted in different ways and/or on different surfaces to provide various different functions. For example, without limitation, some embodiments may be mounted on a table or the floor. Such embodiments may serve to attach a broom or sweeping device to the floor, latching around the handle of the broom. Other such embodiments may be used for attaching larger items to the floor in a garage including, without limitation, a snow blower or lawnmower, which may be attached to the floor via a wire to substantially inhibit the device from moving around in the garage. The mounting bracket and locking mechanism in such embodiments may be larger and likely made of a metal such as, but not limited to, steel. Other embodiments may be mounted into or onto a ceiling to hold hanging plants for example to the ceiling. Such embodiments may comprise inversely curved hanging hooks and a locking mechanism that may be manually guided along the tracks.

In some embodiments the tracks may be separate from the mounting bracket. Such embodiments may also comprise a locking mechanism with posts that engage with the tracks. It is contemplated that the tracks may be curved at one end and may comprise notches in the opposite ends, however, the tracks and notches may be altered to function differently than those described by way of example in the foregoing. Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a self-locking device according to the present invention will be apparent to those skilled in the art. Various aspects of the invention have been described above by way of illustration, and the specific embodiments disclosed are not intended to limit the invention to the particular forms disclosed. The particular implementation of the self-locking devices may vary depending upon the particular context or application. By way of example, and not limitation, the self-locking devices described in the foregoing were principally directed to implementations in which objects may be secured to the devices in a hanging position; however, similar techniques may instead be applied to applications in which objects are secured in positions other than hanging, for example without limitation, bundling cables together in an entertainment system or computing system and securing a tablecloth to the edges of a table, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A device comprising:
  a locking mechanism, wherein said locking mechanism is configured to lock an object;
  a mounting bracket, comprising:
    a guide track implement, in which said guide track implement comprises at least one or more guide tracks configured to engage said locking mechanism;
    at least one or more notches configured to allow said locking mechanism to rotate out into an open position;
    a back stop, wherein said back stop is configured to hold said locking mechanism in said at least one or more notches in an open position; and
    a curved lip end portion, wherein said curved lip end portion is configured to inhibit said locking mechanism from escaping said at least one or more guide tracks; and
  a base plate, wherein said base plate is disposed proximately between said mounting bracket and a mounting surface when the base plate is engaged with the mounting surface, and wherein said mounting bracket and said guide track implement are elevated off the mounting surface by said base plate when the base plate is engaged with the mounting surface,
  wherein said base plate is further configured to provide a space for a rear portion of said locking mechanism to slide along said guide track implement between said mounting bracket and the mounting surface when the base plate is engaged with the mounting surface.

2. The device of claim 1, wherein said base plate is configured to mount said device to the mounting surface with at least one of, an adhesive material, nails, screws and a hook and loop material.

3. The device of claim 2, further comprising a hook, in which said hook comprises at least one or more hooks, wherein said hook is configured to support a frame wire.

4. The device of claim 2, further comprising a curved cap disposed at a top portion of said mounting bracket, wherein said curved cap is configured to substantially inhibit wires or other hanging means from catching on the top portion of said mounting bracket or base plate.

5. The device of claim 4, in which said locking mechanism comprises a post implement that is configured to enable said locking mechanism to engage with said guide track implement.

6. The device of claim 5, in which said post implement comprises at least two or more posts.

7. The device of claim 6, in which said curved lip end portion comprises at least two curved portions.

8. The device of claim 7, in which said locking mechanism further comprises a hooked tip that is configured to engage with a hanging hardware on an object being hung.

9. The device of claim 8, in which said locking mechanism further comprises a curved portion that is operable for ensuring that the hanging hardware on the object being hung is seated correctly.

10. A device comprising:
  means for locking an object;
  means for engaging said object locking means;
  means for holding said locking means in an open position;
  means for retaining said locking means in the open position;
  means for inhibiting said locking means from escaping said means for engaging; and
  means for providing a space for a rear portion of said means for locking to slide along said engaging means.

11. The device of claim 10, further comprising a means for supporting a frame wire.

12. The device of claim 11, further comprising a means for inhibiting wires or other hanging means from catching on a top portion of said engaging means.

13. The device of claim 12, further comprising a means for enabling said object locking means to engage with said engaging means.

14. The device of claim 13, further comprising a means for engaging with a hanging hardware on an object being hung and a means for ensuring that the hanging hardware on the object being hung is seated correctly.

15. A device comprising:
  a locking mechanism, wherein said locking mechanism is configured to lock an object, said locking mechanism comprising:
    a post implement that is configured to enable said locking mechanism to engage with a guide track implement; and
    a hooked tip that is configured to engage with a hanging hardware of the object;
  a mounting bracket, comprising:
    the guide track implement, in which said guide track implement comprises at least one or more guide tracks configured to engage said locking mechanism;

at least one or more notches configured to allow said locking mechanism to rotate out into an open position;

a back stop, wherein said back stop is configured to hold said locking mechanism in said at least one or more notches in an open position; and a curved lip end portion, wherein said curved lip end portion is configured to inhibit said locking mechanism from escaping said at least one or more guide tracks;

a base plate, wherein said base plate is disposed proximately between said mounting bracket and a mounting surface when the base plate is engaged with the mounting surface, and wherein said mounting bracket and said guide track implement are elevated off the mounting surface by said base plate when the base plate is engaged with the mounting surface, wherein said base plate is further configured to provide a space for the rear portion of said locking mechanism to slide along said guide track implement between said mounting bracket and the mounting surface when the base plate is engaged with the mounting surface.

16. The device of claim 15, wherein said base plate is configured to mount said device to the mounting surface with at least one of, an adhesive material, nails, screws and a hook and loop material.

17. The device of claim 16, further comprising a hook, in which said hook comprises at least one or more hooks, wherein said hook is configured to support a frame wire.

18. The device of claim 17, further comprising a curved cap disposed at a top portion of said mounting bracket, wherein said curved cap is configured to substantially inhibit wires or other hanging means from catching on a top portion of said mounting bracket or base plate.

19. The device of claim 18, in which said post implement comprises at least two or more posts.

20. The device of claim 19, in which said locking mechanism further comprises a curved portion that is operable for ensuring that the hanging hardware on the object being hung is seated correctly.

* * * * *